(12) United States Patent
Marcaccio

(10) Patent No.: US 6,942,177 B1
(45) Date of Patent: Sep. 13, 2005

(54) STATIC DISCHARGE CABLE FOR AIRCRAFT AND METHOD OF USING SAME

(75) Inventor: John D. Marcaccio, Mount Airy, NC (US)

(73) Assignee: Aerial Machine & Tool Corporation, Vesta, VA (US)

(*) Notice: Subject to any disclaimer, the term of this patent is extended or adjusted under 35 U.S.C. 154(b) by 0 days.

(21) Appl. No.: 10/973,414

(22) Filed: Oct. 27, 2004

(51) Int. Cl.[7] .............................................. B64D 45/02
(52) U.S. Cl. ................ 244/1 A; 244/118.1; 244/137.1; 244/121; 361/218
(58) Field of Search ................................ 244/1 R, 1 A, 244/129.1, 121, 118.1, 137; 361/212–224

(56) References Cited

U.S. PATENT DOCUMENTS

| | | | |
|---|---|---|---|
| 2,129,811 A | * | 9/1938 | Bissell ........................ 439/472 |
| 2,985,799 A | | 5/1961 | Steele |
| 3,891,165 A | * | 6/1975 | Day et al. ................. 244/137.4 |
| 4,059,846 A | * | 11/1977 | Eisenhauer .................. 361/212 |
| 4,283,749 A | | 8/1981 | Buser et al. |
| 4,698,723 A | * | 10/1987 | Bryan, Jr. ................... 361/218 |
| 4,736,906 A | | 4/1988 | Taillet |
| 4,886,221 A | | 12/1989 | Honigsbaum |
| 4,986,471 A | * | 1/1991 | Hethcoat ........................ 239/3 |
| 5,190,331 A | * | 3/1993 | Corbin ......................... 294/24 |
| 5,208,724 A | | 5/1993 | Honigsbaum |

* cited by examiner

Primary Examiner—Galen Barefoot
(74) Attorney, Agent, or Firm—Banner & Witcoff, Ltd.

(57) ABSTRACT

A static discharge cable is attachable to a rescue hook or other component being lowered by an aircraft. The cable has a first fitting attachable to the hook or other component, a second fitting attached to the first fitting, and a conductive cable attached to the second fitting. The first and second fitting are attached using a shear pin. Attached to the other end of the cable is a light holder.

1 Claim, 4 Drawing Sheets

US 6,942,177 B1

STATIC DISCHARGE CABLE FOR AIRCRAFT AND METHOD OF USING SAME

FIELD OF THE INVENTION

The present invention relates to dissipation of static charge from an aircraft, and more particularly, to methods and apparatus for dissipating such charge while an aircraft is in flight.

BACKGROUND OF THE INVENTION

Helicopters and other types of aircraft can acquire a static charge during flight. This charge can be hazardous to personnel under some circumstances. Examples of such circumstances include helicopter rescue operations. In many of such operations, a helicopter approaches a person on the ground after a prolonged flight. The person being rescued (hereinafter called a "rescuee" for convenience) may be in water or otherwise not located in an area where the helicopter may land. Accordingly, it is often necessary for the rescuee to be lifted into the helicopter using a cable and hoist system. When the rescue cable is lowered to the rescuee, the static charge built up by the helicopter is discharged when the cable end (or hook or other fitting on the cable end) touches the ground or water. This charge can be significant. Moreover, the rescuee person may be hypothermic, injured or otherwise in distress, and potentially more susceptible to injury from an electrical shock.

There are various prior art systems for dissipating a static charge from an aircraft in flight. U.S. Pat. No. 4,283,749 to Buser et al. describes a grounding device attachable to an aircraft wheel housing or cargo hook, and/or which can be lowered from tree-top heights using a cable and winch. Although Buser et al. describe various embodiments, all of those embodiments require a number of conductive elements (e.g., conductive ceramic beads, conductive ceramic resistors, conductive ceramic discs) which must be assembled to form a chain of conductive elements. A simpler system could reduce manufacturing costs and be less prone to malfunction.

U.S. Pat. No. 5,208,724 to Honigsbaum describes a process and apparatus for discharging electric potential between a flying "hovercraft" (helicopter) and the ground. The Honigsbaum process uses a conductive liquid stream to establish a discharge path between the hovercraft and the earth. This system is somewhat complicated, and requires an aircraft or ground personnel to have a sufficient supply of liquid to maintain a discharge path. U.S. Pat. No. 4,059,846 to Eisenhauer teaches a lift having a grounding wire that provides a static discharge conduit between an aircraft and the ground or water. The grounding wire hangs from a metal plate used to suspend a raft from a helicopter. However, the Eisenhauer device could present a safety concern in many situations. For example, grounding wire could become entangled with trees or other ground objects if used in land rescue. U.S. Pat. No. 4,886,221 to Honigsbaum describes a charge control system using a droplet charging mechanism connected to an external portion of the aircraft. A charge control device of such a system could be damaged by debris in the air, flying objects or even animals.

There thus remains a need for simpler systems and methods to discharge electrostatic potential from a flying aircraft.

SUMMARY OF THE INVENTION

Embodiments of the invention address concerns associated with known methods and devices for aircraft charge removal. In some embodiments, the invention includes a conductive cable that is attachable to a rescue hook or otherwise couplable to a rescue line being lowered to person on the ground (or in the water). The conductive cable is attached so as to break away when pulled on with excessive force. In certain embodiments, a first fitting is attached to a leading end of the cable, and a second fitting is attached to the first fitting using a shear pin. The second fitting is, in turn, couplable to a rescue cable. In still other embodiments, the cable includes a light-holding fitting attached to its trailing end. Embodiments of the invention also include methods for using a static discharge cable.

DETAILED DESCRIPTION OF THE PREFERRED EMBODIMENTS

Embodiments of the invention are described by reference to helicopter rescue operations. The invention is also applicable to other activities and may be used by other types of vehicles. As used herein (including the claims), and unless the context clearly requires otherwise, "coupled" and "attached" includes two components that are connected via one or more intermediate components.

Figure 1:
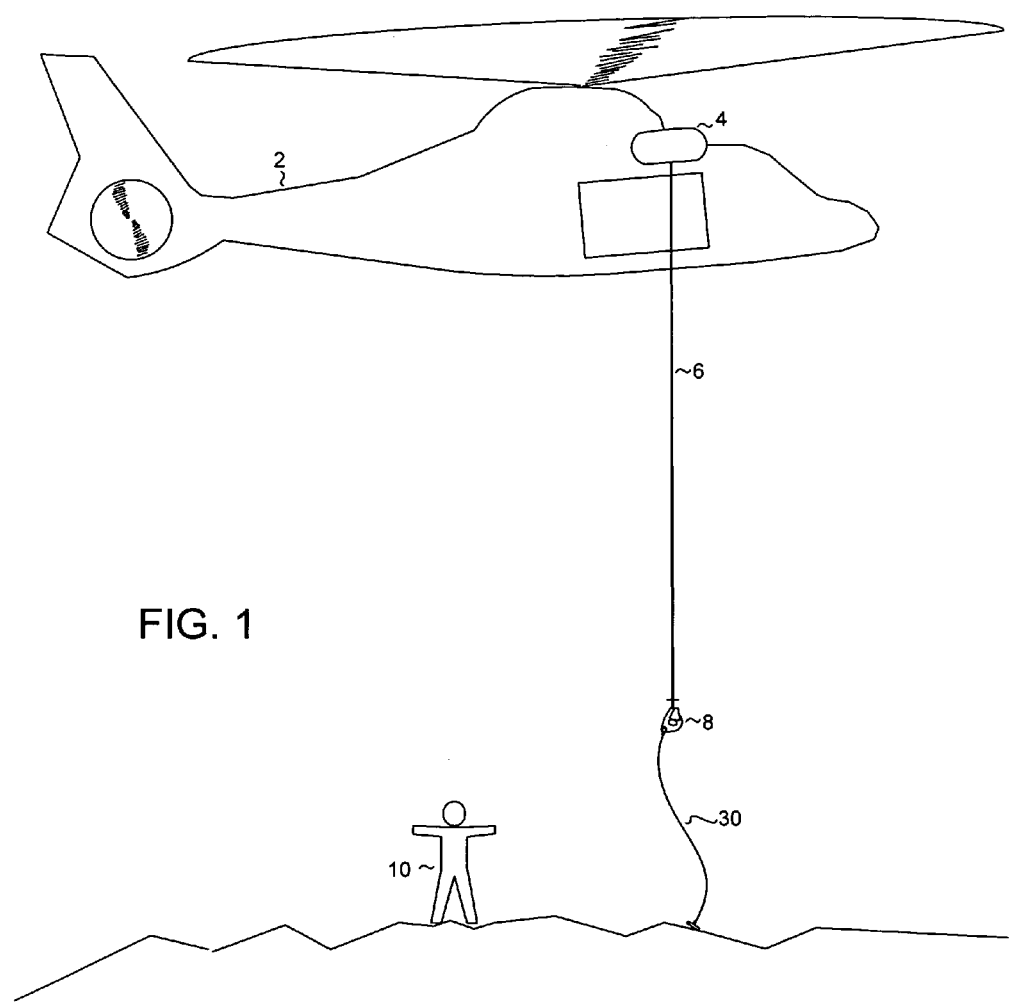
FIG. 1 illustrates use of a static discharge cable in accordance with at least some embodiments of the invention.

FIG. 1 shows use of a static discharge cable according to at least one embodiment of the invention. Helicopter 2 hovers above a person 10 being rescued (the "rescuee"). Helicopter 2 includes a hoist 4 which lowers a rescue cable 6 having a hook 8. Rescue hook 8 may be, e.g., a rescue hook as described in commonly-owned U.S. Pat. No. 6,636,589, incorporated by reference herein. Attached to rescue hook 8 is a static discharge cable 30. As helicopter 2 approaches rescuee 10, but prior to reaching rescuee 10, rescue hook 8 is lowered toward the ground. Static discharge cable 30 hangs below rescue hook 8, and thus contacts the ground first. Once static discharge cable 30 reaches the ground, static electricity from helicopter 2 is discharged. Rescuee 10 (or rescue personnel on the ground) can then move toward and retrieve rescue hook 8. After attaching rescue hook 8 to a harness or other device, rescuee 10 can be hoisted into helicopter 2. Although FIG. 1 shows rescue of a person on land, a similar procedure could be followed for rescue of a person in the water.

Figure 2:
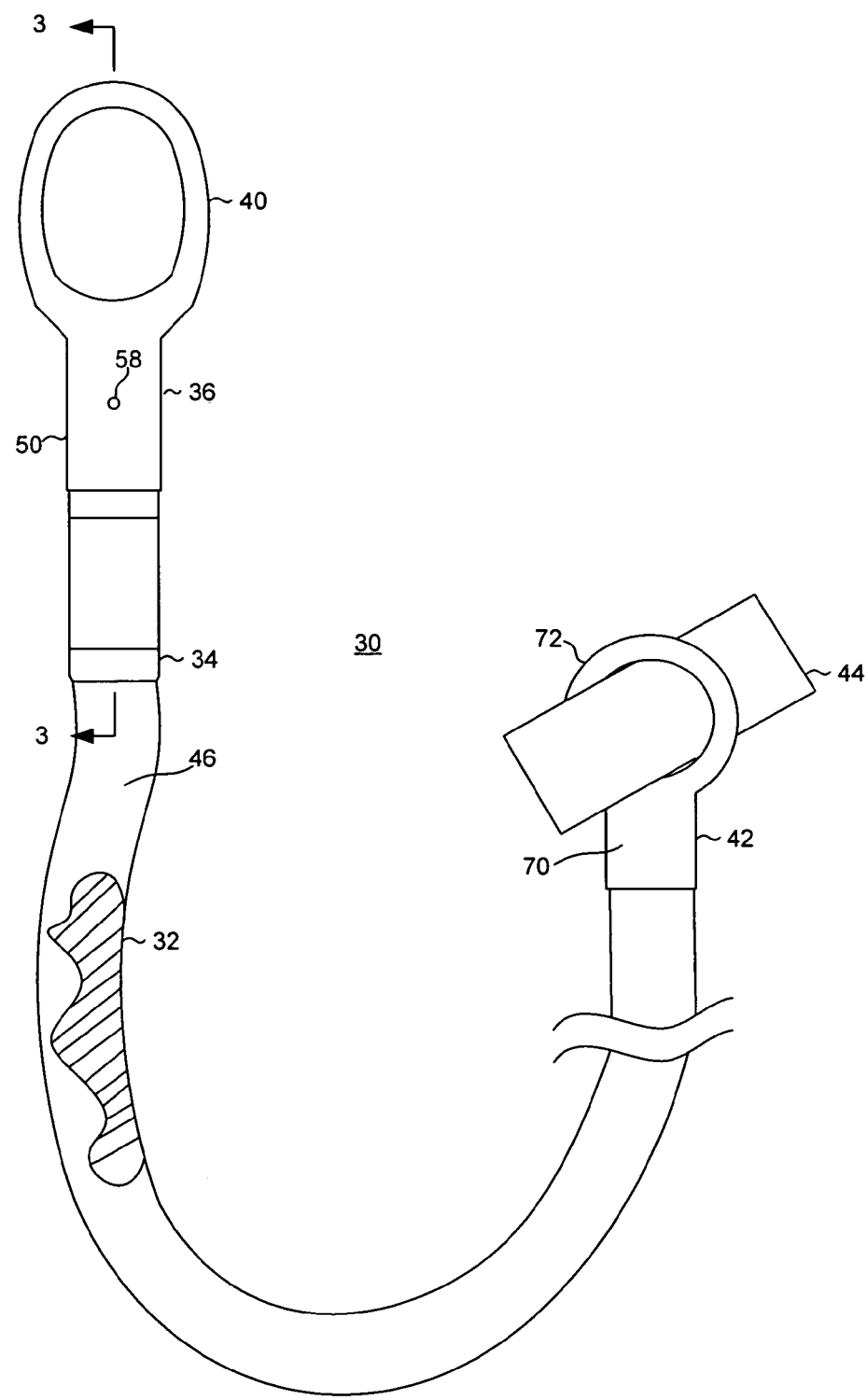
FIG. 2 is a front view of a static discharge cable according to at least one embodiment of the invention.

FIG. 2 is a front view of static discharge cable 30 according to at least some embodiments of the invention. Static discharge cable 30 includes a conductive member 32. In at least some embodiments, conductive member 32 is approximately ten feet long and is made from stainless steel cable (wire rope) which is 3/16 inches in diameter. Other sizes (e.g., 1/4 inch diameter) and materials can be used. A first conductive fitting 34 is attached to the leading end of conductive member 32 by, e.g. swaging. First fitting 34 then fits within a second fitting 36 and is retained by a shear pin 58. Second fitting 36 has an eyelet 40 which is used to attach static discharge cable 30 to rescue hook 8. Attached to the trailing end of conductive member 32 via swaging or other mechanism is a light holder 42. As is described in more detail below, light holder 42 is used to retain an illuminating element 44. Conductive member 32 is covered along its length between first fitting 34 and light holder 42 with a plastic sheath 46.

Figure 3:
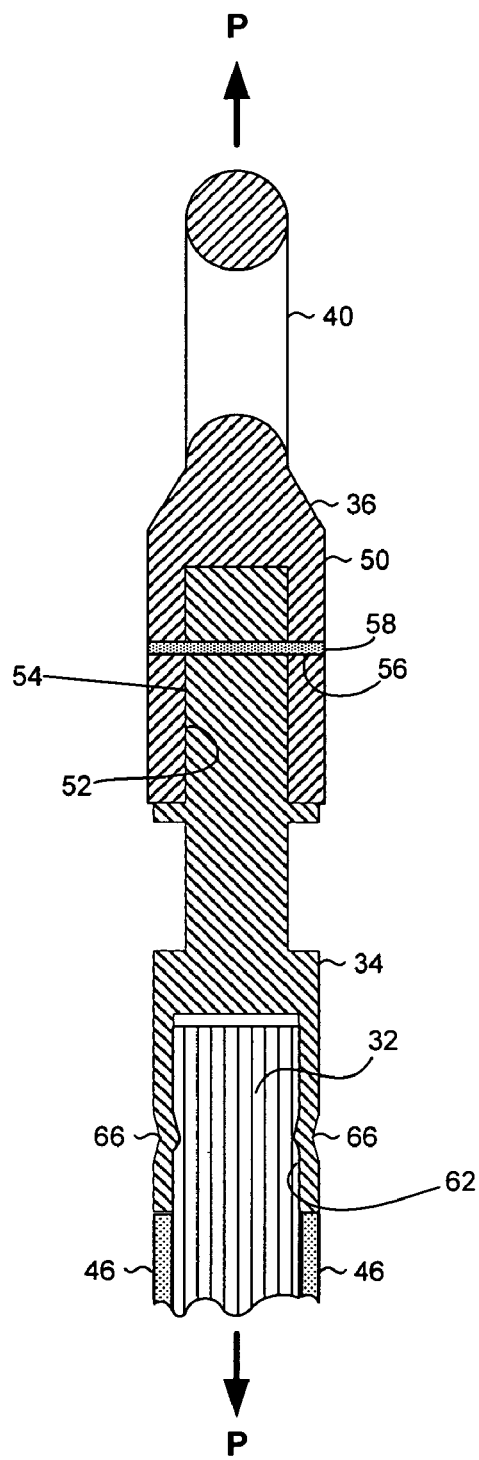
FIG. 3 is a partial cross section taken along the lines indicated in FIG. 2.

FIG. 3 is a partial cross section taken along lines 3—3 of FIG. 2. Second fitting 36 is formed from stainless steel and includes a collar 50. In at least some embodiments, eyelet 40 is welded to collar 50. Collar 50 include a bore 52 which receives a tang 54 of first fitting 34. A hole 56 is drilled through sides of collar 50 and tang 54, and holds shear pin 58. Shear pin 58 is press fit into hole 56 and its ends ground flush with the outer surface of collar 50. In at least some embodiments, shear pin 58 is formed from type 308 stainless steel and is approximately 0.035 inches in diameter. In other embodiments, shear pin 58 is between about 0.032 inches and about 0.039 inches in diameter.

First fitting 34 also includes a bore 62. Bore 62 receives the leading end of conductive member 32. The outer surface of first fitting 34 is then swaged (66) or crimped so as to retain conductive member 32.

Returning to FIG. 2, conductive member 32 is covered by a plastic sheath 46 between first fitting 34 and light holder 42. Plastic sheath 46 may be formed from vinyl or other plastic material. In some embodiments, conductive member 32 may be formed from a wire rope or other type of multi-strand cable. As such cables may become frayed, small wire ends sometimes protrude along the outer surface of the cable. Plastic sheath 46 serves to contain such wire ends and prevent them from injuring a person grasping the cable. In some embodiments, sheath 46 has a high visibility color and/or pattern to aid rescuees, flight crews and rescue personnel in visualizing the cable position during rescue operations. Such colors and patterns include fluorescent (also known as "day glow") orange, yellow and other colors, yellow and black stripes, etc. Sheath 46 may also have reflective material on its outer surface.

In some embodiments, static discharge cable 30 includes light holder 42 on its trailing end. Light holder 42 is used to hold an illuminating element 44, which can be a chemiluminescent light stick (such as those sold under the trade name CYALUME by Omniglow Corporation of West Springfield, Mass.), strobe light, or other light emitting device. In this manner, static discharge cable 30 (and ultimately, rescue hook 8) can more easily be seen in low light conditions. Light holder 42 may be formed from stainless steel and includes a sleeve 70 and an attached eyelet 72. Eyelet 72 is sized so that illuminating element 44 can pressed into the eyelet with hand pressure and retained therein. The trailing end of conductive member 32 is inserted into a bore (not shown) of sleeve 70 and attached by swaging.

Shear pin 58 provides a safety release mechanism in the event that static discharge cable 30 becomes snagged, fouled or otherwise captured by objects on the ground (or in the water) when the cable is being used. The shear strength of shear pin 58 is significantly less than the tensile strength of conductive member 32, first fitting 34, second fitting 36 or the connection between first fitting 34 and conductive member 32, and first fitting 34 will separate from second fitting 36 in the event of excessive pulling force P (see FIG. 3) on static discharge cable 30. In at least some embodiments, shear pin 58 is sized so that first and second fittings 34 and 36 will separate under a breakaway pulling force of approximately 200 pounds. In other embodiments, shear pin 58 is sized so that first and second fittings 34 and 36 will separate under a breakaway pulling force between about 180 and about 220 pounds.

Figure 4:
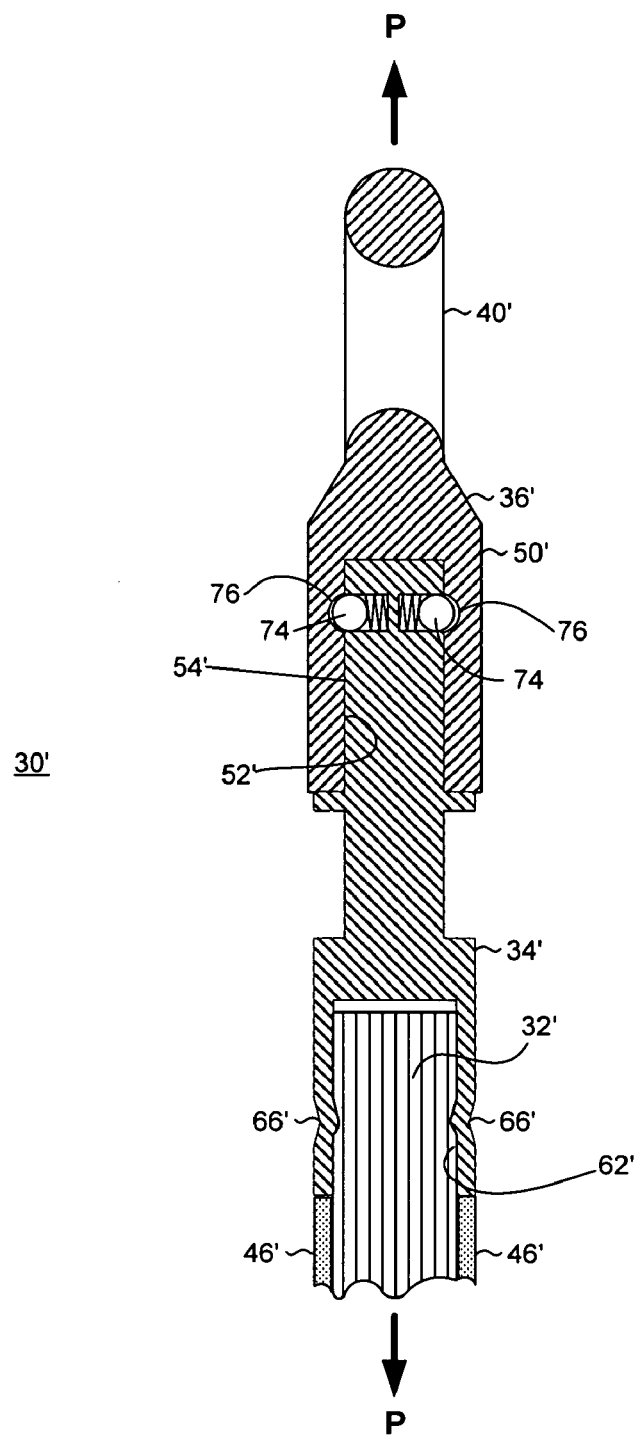
FIG. 4 is partial cross section, taken from a location similar to that of FIG. 3, of an alternate embodiment of the invention.

In other embodiments, other types of safety release mechanisms can be used. On such embodiment is shown in FIG. 4. FIG. 4 is a cross-section of a first fitting 34' and second fitting 36' of a static discharge cable 30'. Except as described below, static discharge cable 30' is substantially the same as static discharge cable 30 of FIGS. 2 and 3. A part in FIG. 4 having a reference number followed by an apostrophe (e.g., "34'") corresponds to a part in FIGS. 2 and 3 having the same reference number without the apostrophe (e.g., "34"). The cross section of FIG. 4 is taken from the same general location as that of FIG. 3. As shown in FIG. 4, spring-loaded balls 74 captured in tang 54' fit into detents 76 within bore 52' of collar 50'. When excessive pulling force is exerted on the static discharge cable, balls 74 are pushed within tang 54', and first fitting 34' separates from second fitting 36'. As yet another alternative, the first and second fittings could be formed as an integral unit, with a safety release mechanism incorporated into the attachment of the conductive member to that integral unit. For example, the swaging of that unit onto a cable end could be performed with only enough force to hold the cable in place under relatively light tensile force.

Although specific examples of carrying out the invention have been described, those skilled in the art will appreciate that there are numerous variations and permutations of the above described systems and techniques that fall within the spirit and scope of the invention as set forth in the appended claims. As but one example, materials other than those described herein could be used. As yet another example, fastening mechanisms other than eyelets could be used for attaching a static discharge cable to a hook or other object. Such mechanisms include, but are not limited to, threaded connections. Similarly, other types of mechanical connections between a light holder and an illuminating element could be used. Indeed, certain embodiments of the invention lack a light holder altogether. Accordingly, the invention is not to be limited by the examples given herein, but is instead defined by the appended claims.

What is claimed is:

1. A static discharge cable for use in helicopter rescue operations, comprising:
   a first fitting having an eyelet for attachment to a rescue hook and a collar portion attached to the eyelet, said collar portion having a longitudinal bore and a transverse hole formed therein;
   a second fitting having a longitudinal cable-receiving bore and a tang, the tang being inserted into the longitudinal bore and having a hole formed therein, the tang hole being in alignment with the transverse hole;
   a shear pin within the transverse hole and the tang hole;
   a cable having leading and trailing ends, the leading end being inserted into the cable-receiving bore of the second fitting and secured therein by swaging of the external surface of the second fitting;
   a light holder attached to the trailing end of the cable, the light holder having an eyelet sized to receive and retain a light emitting device inserted into the light holder eyelet with hand pressure; and
   a plastic sheath covering the cable between the second fitting and the light holder, the plastic sheath having at least one of a high visibility color and a high visibility pattern formed on an exterior surface.

* * * * *